US012650157B2

(12) United States Patent
Schreiber

(10) Patent No.: US 12,650,157 B2
(45) Date of Patent: Jun. 9, 2026

(54) GEARBOX

(71) Applicant: WITTENSTEIN SE, Igersheim (DE)

(72) Inventor: Heiko Schreiber, Doberschau (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 19/094,145

(22) Filed: Mar. 28, 2025

(65) Prior Publication Data

US 2025/0327509 A1 Oct. 23, 2025

(30) Foreign Application Priority Data

Apr. 23, 2024 (DE) .......................... 102024111359.6

(51) Int. Cl.
| | |
|---|---|
| *F16H 25/06* | (2006.01) |
| *B23F 9/02* | (2006.01) |
| *F16H 1/32* | (2006.01) |
| *F16H 49/00* | (2006.01) |
| *F16H 55/08* | (2006.01) |

(52) U.S. Cl.
CPC .................. *F16H 1/32* (2013.01); *B23F 9/02* (2013.01); *F16H 2001/325* (2013.01); *F16H 25/06* (2013.01); *F16H 49/001* (2013.01); *F16H 55/0886* (2013.01)

(58) Field of Classification Search
CPC ............. F16H 49/001; F16H 2049/003; F16H 55/0886; F16H 25/06; B23F 19/005; B23F 19/12; B23F 9/02
See application file for complete search history.

(56) References Cited

U.S. PATENT DOCUMENTS

| | | | | |
|---|---|---|---|---|
| 12,025,093 | B2 * | 7/2024 | Weber | .................. H02K 7/1838 |
| 2010/0077882 | A1 | 4/2010 | Schreiber | |
| 2016/0298748 | A1 | 10/2016 | Schreiber et al. | |

(Continued)

FOREIGN PATENT DOCUMENTS

| | | | | |
|---|---|---|---|---|
| DE | 102015105523 | A1 | 10/2016 | |
| DE | 102016116438 | B3 * | 1/2018 | ........... F16H 49/001 |
| DE | 102019129662 | A1 * | 5/2021 | ............. F16H 49/00 |

(Continued)

OTHER PUBLICATIONS

Niemann, G.; Winter, H.: Maschinenelemente. Band II. 2. Auflage. Berlin u.a. : Springer-Verlag, 1983. S. 114-115. ISBN 3-540-11149-2.

(Continued)

*Primary Examiner* — Sherry L Estremsky
(74) *Attorney, Agent, or Firm* — Bachman & LaPointe, P.C.

(57) ABSTRACT
A gearbox (1), in particular coaxial gearbox, includes a ring gear having an internal toothing (3); a tooth carrier (5) having guides (7) which are aligned radially in terms of a rotation axis of the gearbox; teeth (9) which, for engaging with the internal toothing (3), are received in the guides (7), wherein the teeth (9) are mounted in the guides (7) displaceable in the direction of their longitudinal axis (11) relative to the tooth carrier (5); and a cam disk (13) which is rotatable about the rotation axis and is operatively connected to the teeth (9); wherein the teeth (9) have in each case a tooth flank (17) which is at least partially curved along a width curve (51) extending over a width (41) of the tooth flank (17).

20 Claims, 5 Drawing Sheets

(56)                    References Cited

U.S. PATENT DOCUMENTS

2021/0131546 A1 *   5/2021   Schreiber ............... F16H 49/001
2024/0392867 A1 *   11/2024   Darby ..................... B64C 13/28

FOREIGN PATENT DOCUMENTS

DE         102019129667  A1      5/2021
EP            2129935  B1      7/2010
WO      WO-2022077868  A1 *   4/2022    ........... F16H 49/001
WO      WO-2023071231  A1 *   5/2023    .............. B23P 15/14

OTHER PUBLICATIONS

German Search Report dated Dec. 3, 2024, issued in corresponding
application DE102024111359.6.

* cited by examiner

GEARBOX

BACKGROUND OF THE INVENTION

The invention relates to a gearbox, to a tooth for a gearbox, and to a method for producing a tooth for a gearbox.

Gearboxes which comprise teeth that are mounted in a tooth carrier so as to be displaceable radially in relation to a rotation axis of the gearbox are known in the prior art. The teeth are operatively connected to a cam disk which has a profiling in the circumferential direction about the rotation axis. The cam disk can be used in particular for driving the teeth in the radial direction. The teeth engage in a toothing in such a way that a relative movement between the tooth carrier with the teeth and the toothing arises. The relative movement between the toothing and the teeth here is usually smaller than the movement of the cam disk with the profiling by at least one magnitude. High gear ratios can be achieved in this way; an example of such a gearbox is published in EP 2 129 935 A2.

However, known gearboxes display a distinctive running-in behavior when put into service for the first time. Moreover, known gearboxes can have restrictions in terms of a load-bearing capability.

SUMMARY OF THE INVENTION

It is an object of the invention to specify a gearbox or a tooth, which are improved in comparison to gearboxes known in the prior art, whereby it is the intention to achieve a reduced running-in behavior, higher load-bearing capability. It is furthermore an object of the invention to specify a method for producing a tooth for a gearbox.

This object is achieved by a gearbox as disclosed herein, and by a tooth and a method also as disclosed herein. Advantageous refinements and embodiments are derived from the dependent claims and from this description.

One aspect of the invention relates to a gearbox, in particular a coaxial gearbox. The gearbox comprises a ring gear having an internal toothing. The gearbox comprises a tooth carrier having guides which are aligned radially in terms of a rotation axis of the gearbox. The gearbox comprises teeth which for engaging with the internal toothing are received in the guides, wherein the teeth are mounted in the guides so as to be displaceable in the direction of their longitudinal axis relative to the tooth carrier. The gearbox comprises a cam disk which is rotatable about the rotation axis and is operatively connected to the teeth. The teeth have in each case a tooth flank which is produced so as to be at least partially curved along a width curve extending over a width of the tooth flank.

A further aspect of the invention relates to a gearbox, in particular a coaxial gearbox. The gearbox comprises a ring gear having an internal toothing. The gearbox comprises a tooth carrier having guides which are aligned radially in terms of a rotation axis of the gearbox. The gearbox comprises teeth which for engaging with the internal toothing are received in the guides, wherein the teeth are mounted in the guides so as to be displaceable in the direction of their longitudinal axis relative to the tooth carrier. The gearbox comprises a cam disk which is rotatable about the rotation axis and is operatively connected to the teeth. The teeth have in each case a tooth head, wherein a tooth head width curve extending along the tooth head and over a tooth width is produced so as to be at least partially curved in the direction of the longitudinal axis of the tooth.

Yet another aspect of the invention relates to a tooth for a gearbox according to one of the typical embodiments described herein. The tooth has a tooth flank which is produced so as to be at least partially curved, in particular convexly curved, along a width curve extending over a width of the tooth flank. Additionally or alternatively, the tooth has a tooth head, wherein a tooth head width curve extending along the tooth head and over a tooth width is produced so as to be at least partially curved, in particular convexly curved, in the direction of the longitudinal axis of the tooth.

A further aspect of the invention relates to a method for producing a tooth for a gearbox according to one of the typical embodiments described herein. The method comprises providing a tooth blank of the tooth. The method comprises producing a tooth flank of the tooth, wherein the tooth flank is produced so as to be at least partially curved along a width curve extending over a width of the tooth flank. Additionally or alternatively, the method comprises producing a tooth head of the tooth, wherein a tooth head width curve extending along the tooth head and over a tooth width is produced so as to be at least partially curved in the direction of the longitudinal axis of the tooth.

Typical embodiments of the invention relate to gearboxes, in particular coaxial gearboxes. Gearboxes of the invention typically comprise a cam disk which is rotatable about a rotation axis of the gearbox. The cam disk typically has a profiling in the circumferential direction about the rotation axis, for example a profiling having at least one elevation in the radial direction, in particular having at least or exactly two elevations, or having at least or exactly three elevations.

Typical gearboxes have a tooth carrier having guides which are aligned radially in terms of the rotation axis. Typically, one tooth according to the embodiments described herein is in each case received in the guides. The teeth are typically in each case mounted in a guide so as to be displaceable in the direction of their longitudinal relative to the tooth carrier. Typically, the teeth are mounted in the tooth carrier so as to be in each case displaceable in exactly one direction, typically in the direction of the longitudinal axis of the tooth. The guides of the tooth carrier can in each case be embodied as a slot or an opening, in particular as a slot or an opening having a consistent cross section in the radial direction. The teeth are typically inserted in the tooth carrier with a tooth head extending parallel to the rotation axis.

In typical embodiments of the gearboxes according to the invention, the teeth are embodied so as to be flexurally rigid. The term "flexurally rigid" is typically to be understood in its technical sense, meaning that due to the rigidity of the material of the teeth, flexing of the teeth is so minor that it is at least substantially irrelevant in terms of the kinematics of the gearbox. Flexurally rigid teeth comprise in particular teeth which are produced from a metal alloy, in particular steel or a titanium alloy, a nickel alloy or other alloys.

Typical gearboxes have a ring gear having an internal toothing. Typically, the flanks of the internal toothing herein extend parallel to the rotation axis. The tooth carrier is typically disposed radially between the ring gear and the cam disk. In particular, the cam disk can be disposed radially on the inside, for example about or on the rotation axis of the gearbox. Unless otherwise stated, the terms "axial", "radial" and "in the circumferential direction" herein are typically to be understood in terms of the rotation axis of the gearbox.

A pivoting segment is in each case disposed between the teeth and the profiling of the cam disk in typical embodiments. The pivoting segments are typically disposed on a rolling bearing which rests on the profiling. For example, the rolling bearing can be formed as a needle roller bearing. Typically, the tooth is loosely connected to the pivoting segment. "Loose connection" in this context means in particular that the tooth segment is merely placed on the pivoting segment, in particular directly placed thereon. Pivoting segments typically comprise a profile which prevents the tooth from sliding off the pivoting segment, or prevents the pivoting segment from sliding out of position, at least in one direction. Such a profiling can be, for example, a bead which engages in a clearance on a radially inner end of the tooth. In terms of a potential embodiment of a pivoting segment, reference is made to DE 10 2015 105 523 A1.

In typical embodiments, the cam disk is operatively connected to the teeth. In particular, the cam disk can be used as a drive element for driving the teeth in the radial direction. During rotation of the cam disk about the rotation axis, the teeth are typically moved in the radial direction by the profiling in such a way that some of the teeth engage in the internal toothing of the ring gear at any one time, causing a relative movement between the tooth carrier and the ring gear. The output of the gearbox can take place by way of the tooth carrier or the ring gear.

Typical embodiments can also be used in the opposite direction of transmission, the cam disk being used as an output element and the tooth carrier being used as a drive element in the process. In this way, a generator can be driven by way of the cam disk, for example, whereby a torque driving the tooth carrier at a low rotating speed is utilized. A drive input or output by way of the housing, or the toothing of the ring gear, is also possible.

Typical gearboxes according to the invention are used, for example, in robotics, in machine tools, packaging machines, lathes or milling machines, medical technology, logistics, automotive engineering, the construction sector and other industrial drivetrains. When operating in conjunction with generators, said gearboxes can be used in wind power installations or other installations for generating energy.

Said gearboxes are particularly advantageous for applications with high requirements in terms of torque and output density, large hollow shaft diameters, high rigidity, little play or zero play, or compactness.

In typical embodiments, the teeth comprise in each case a tooth body. The tooth body typically has a sliding face for mounting the tooth in a friction bearing of the tooth in a guide of the tooth carrier. In typical embodiments, the teeth are in each case formed as a single tooth, in particular as a round tooth. A round tooth typically has a round tooth body. In particular, the tooth body can be designed to be round, for example circular, in the circumferential direction about the longitudinal axis of the tooth. In embodiments, the tooth body is formed so as to be at least substantially cylindrical at least in a region along the longitudinal axis of the tooth. Typically, a guide of the tooth carrier has an opening in the radial direction, which corresponds to the cross section of the tooth, for example a round, in particular circular, opening for a round tooth.

In typical embodiments, the teeth comprise in each case at least one tooth flank, in particular exactly two tooth flanks. The at least one tooth flank is typically disposed in a region radially outside the tooth body. In typical embodiments, the teeth have in each case one tooth head. The tooth head is typically provided so as to be adjacent to the tooth flank, and extends over a tooth width of the respective tooth. The tooth width of the tooth corresponds to the width of the tooth in the parallel direction in relation to the rotation axis of the gearbox. Typically, the tooth width of the tooth corresponds to the width of the tooth head. The tooth head is typically disposed on one end of the tooth in terms of the longitudinal direction of the tooth, in particular on a radially outer end of the tooth in terms of the rotation axis of the gearbox. In typical embodiments, the tooth flank is inclined in relation to the longitudinal axis of the tooth. For example, two tooth flanks of a tooth can converge at least substantially obliquely toward the tooth head of the tooth. The tooth head typically has a surface which extends from a first tooth flank to a second tooth flank of the tooth. In particular, the surface of the tooth head can be designed with a head radius between the two tooth flanks.

In typical embodiments, a tooth flank or a tooth head has a width. The width of a tooth flank or of a tooth head is typically understood to be the extent of the tooth flank or of the tooth head parallel to the rotation axis of the gearbox.

According to typical embodiments, the tooth flank of a tooth is produced so as to be at least partially curved along a width curve extending over the width of the tooth flank. A curved width curved is typically understood to mean a width curve which is not straight, for example an arcuate width curve. In particular, the tooth flank can have in the direction of the width of the tooth flank a tooth flank correction or flank modification in relation to a straight profile of a tooth flank in the direction of the width. The tooth flank correction or flank modification can in particular correspond to a recess of the tooth flank in relation to a straight profile of the tooth flank along the width of the tooth flank. A curved profile of a tooth flank following the width curve herein can also be referred to as a correction, tooth flank correction or flank modification.

In the case of teeth of known gearboxes, such as, for example, the gearbox according to EP 2 129 935 A2, the tooth flank profile over the entire width is linear, i.e. corresponds to a straight line, in the direction of the rotation axis of the gearbox. Known gearboxes can in particular have a distinctive running-in behavior. Teeth having tooth flanks according to embodiments described herein, having a curved width curve, can in particular avoid or reduce edge stress on the edges of the tooth flanks. In known gearboxes, edge stress is created in particular by the ring gear teeth of the ring gear, which are usually wider and thus more rigid in comparison to the teeth, and by an outflow of lubricant from the contact region on the periphery of the toothing. Tooth flanks with a curved width curve according to embodiments described herein can in particular avoid or reduce wear on the peripheries of the meshing contact between a tooth and the ring gear, in particular wear during a running-in phase of the gearbox.

According to typical embodiments, the tooth flank has two peripheral regions along the width curve over the width of the tooth flank, and has a central region between the two peripheral regions. In embodiments, the tooth flank in at least one peripheral region of the two peripheral regions is recessed inward in relation to the central region, particularly curved inward in relation to the central region. "Inward" in this context relates to the interior of the tooth. The tooth flank can be designed to be at least partially convex along the width curve. Typically, proceeding from the central region in both directions of the width of the tooth flank to the peripheries of the tooth flank, the width curve is curved inward.

In typical embodiments, the at least one peripheral region is recessed in a direction perpendicular to the tooth flank by at most 1%, in particular by at most 0.5% or at most 0.2%, of a maximum width of the tooth flank in relation to the central region. In embodiments, the at least one peripheral region is recessed in a direction perpendicular to the tooth flank by at least 0.018, in particular by at least 0.02%, of a maximum width of the tooth flank in relation to the central region. Typically, these recesses correspond to a maximum subtraction on the flank in relation to a central region or a straight profile of the flank; these recesses are in particular present on the outer periphery of the tooth flank. Typically, the maximum width of the tooth flank corresponds to the width of the tooth flank at a transition from the tooth flank to a tooth head of the tooth.

In typical embodiments, the width curve extends so as to be curved in at least one peripheral region of the two peripheral regions, in particular in both peripheral regions. In typical embodiments, the width curve extends so as to be straight in the central region of the tooth flank. For example, the two peripheral regions can in each case comprise at least 10%, in particular at least 208, or at least 25%, of the width of the tooth flank. In embodiments, the two peripheral regions comprise in each case at most 40%, in particular at most 35%, of the width of the tooth flank. For example, the two peripheral regions can in each case comprise approximately 25% of the width of the tooth flank. Typically, the central region comprises the share of the tooth flank from one peripheral region to the other peripheral region. Typically, the specification of the peripheral regions in percentages relates to the distribution of the peripheral regions and of the central region on the radially outer end of the tooth flank in terms of the rotation axis of the gearbox, in particular at the transition from the tooth flank to the tooth head. In particular, the share of the peripheral regions in percentages in other regions of the tooth flank may deviate from the specification in percentages. For example, in the case of a round tooth, the width of the peripheral regions can decrease, and in particular drop to zero, in the profile from the radially outer end of the tooth flank to the radially inner end of the tooth flank. In typical embodiments, the tooth flank has in each case an at least partially curved width curve according to embodiments described herein over at least 50% of the length of the tooth flank, in particular over at least 60% or at least 70%. The length of the tooth flank is understood to be a longitudinal extent of the tooth flank perpendicular to the width of the tooth flank.

In further typical embodiments, the central region can have a width of 0% of the width of the tooth flank. For example, the central region can be a line, in particular a central line, which extends on the tooth flank in a longitudinal direction of the tooth flank. In particular, the tooth flank can be designed to be curved over the entire width along the width curve, in particular be designed to be spherical over the entire width. In embodiments, the tooth flank can in particular have in each case a curved width curve over the entire length of the tooth flank.

According to typical embodiments, the width curve extends on the tooth flank and in a section plane perpendicular to the tooth flank. Typically, the width curve extends in a region of the tooth flank which is provided to contact the internal toothing of the ring gear.

In typical embodiments, the width curve extends symmetrically in terms of a center of the width of the tooth flank. In embodiments, the teeth comprise in each case an additional tooth flank. The tooth flank and the additional tooth flank of a tooth herein can also be referred to as the first tooth flank and the second tooth flank. Typically, the additional tooth flank is produced to mirror-symmetrical to the tooth flank, in particular mirror-symmetrical in terms of a plane which extends along the longitudinal axis of the tooth and parallel to the rotation axis of the gearbox. Symmetrical teeth, in particular symmetrical round teeth, can be installed without any special alignment of individual tooth flanks, for example, and can in particular twist about their respective longitudinal axis during operation.

Typically, a tooth head adjacent to the tooth flank has a tooth head correction. In embodiments, a tooth head width curve extending along the tooth head and over the tooth width is produced so as to be at least partially curved, in particular produced so as to be curved in the direction of the longitudinal axis of the tooth. For example, the tooth head width curve can extend on the tooth head in a plane of the longitudinal axis and the tooth width. In particular, the tooth head width curve in the profile from the center of the tooth head along the tooth width to the periphery of the tooth can be at least partially curved inward, in particular inward in the direction of the longitudinal axis of the tooth, toward the tooth body. This results in a variable tooth head height along the tooth flank or in the tooth width; in particular, the tooth head height decreases from the longitudinal axis toward the periphery of the tooth, for example in the form of a radius or a logarithmic function. In embodiments, the shape of the tooth head width curve corresponds at least substantially to a shape of the width curve of the tooth flank. The tooth head width curve can differ from a width curve on the tooth flank by a linear factor, in particular as a function of an obliqueness of the tooth flank in relation to the longitudinal axis of the tooth. The tooth head width curve can extend so as to be at least partially curved in the form of a logarithmic function or a radius correction on the tooth head and over the tooth width. In particular, a curved part of the tooth head width curve can extend in the form of a logarithmic function or of a radius. In embodiments, the tooth head width curve extends symmetrically in terms of a center of the tooth width of the tooth. Typically, the tooth head is produced so as to be mirror-symmetrical in terms of a plane of the longitudinal axis and the tooth width.

In typical embodiments, the tooth head has two peripheral regions along the tooth head width curve over the tooth width of the tooth. Typically, the tooth head has a central region between the two peripheral regions. Typically, the tooth head in at least one peripheral region of the two peripheral regions is recessed d inward relation to the central region, particularly curved inward in relation to the central region. For example, the two peripheral regions of the tooth head can in each case comprise at least 10%, in particular at least 20% or at least 25%, or at most 40%, in particular at most 35%, of the tooth width, for example in each case approximately 25%. The central region can comprise the entire region between the two peripheral regions. In embodiments, the tooth head width curve extends so as to be curved in at least one peripheral region. The tooth head width curve can extend so as to be straight in a central region. In additional typical embodiments, the central region of the tooth head can have a width of 0% of the tooth width. In embodiments, the peripheral regions and the central region of the tooth head can correspond to the peripheral regions and the central region of the tooth flank.

Typically, the tooth head, in particular a height of the tooth head, in at least one peripheral region of the tooth, in particular in both peripheral regions, is recessed in relation to a maximum height of the tooth head in the direction of the longitudinal axis of the tooth. The tooth head typically has the maximum height in the central region of the tooth head, in particular in a central region about the longitudinal axis. The height of the tooth head herein is understood to be the extent of the tooth head in the direction of the longitudinal axis of the tooth. Typically, the tooth head in the at least one peripheral region is recessed by at least 0.02%, or by at most 28, of the tooth width in relation to a maximum height of the tooth head, or in relation to a straight profile of the tooth head in the direction of the longitudinal axis. In typical embodiments, the tooth head is produced by grinding, in particular by grinding as described herein for the tooth flanks.

In typical embodiments, a recess of the tooth flank or of the tooth head can increase toward the periphery of the tooth flank. For example, the correction value on the periphery of the tooth flank can be more pronounced in order to prevent edge stress. In particular, edge stress can also be prevented at comparatively high compressions during operation, or else in the event of a more intense elastic compression, or flattening, of the tooth flank during contact with the internal toothing.

According to typical embodiments, a curved part of the width curve corresponds to a logarithmic function or a radius correction. In particular, the logarithmic function of the radius correction can describe a recess of the tooth flank along the width curve. For example, a curved part of the width curve can correspond to a logarithmic function according to formula (1) hereunder. In the latter, and in further embodiments described herein, directions are specified with reference to an orthogonal x, y, z-coordinate system for a respective tooth. The x, y, z-coordinate system can in particular correspond to a machine coordinate system for producing the tooth. An x-axis is aligned in the direction of the width of the tooth flank or of the tooth head, in particular parallel to the rotation axis of the gearbox. A y-axis is aligned parallel to a longitudinal axis of the tooth, in particular in the radial direction of the gearbox. The z-axis is aligned perpendicularly to the x-axis and perpendicularly to the y-axis, in particular perpendicularly to the width of the tooth flank or of the tooth head, and perpendicularly to the longitudinal axis of the tooth.

In typical embodiments, the tooth flanks of the teeth are produced by grinding, in particular by profile grinding, for example by discontinuous profile grinding. The grinding can take place according to embodiments described herein, in particular as explained in the context of typical methods for producing a typical tooth, as described herein. The formula (1) hereunder describes in particular a logarithmic function which describes a correction valve dy(x) for an actuation of a grinding disk of a profile grinding machine in the y-direction. By varying the actuation in the y-direction as a function of the x-position, the tooth flank and the tooth head can in particular be produced with a curved width curve of the tooth flank and a curved tooth head width curve of the tooth head.

$$dy(x) = b_{profil} \cdot \ln\left\{ \cfrac{1}{1 - \left[\cfrac{x - x_{start}}{x_{ende} - x_{start}}\right]^2} \right\} \qquad \text{Formula (1)}$$

Formula (1) above describes the correction value, or a width curve or a tooth head width curve, proceeding from the center of the tooth flank or of the tooth head in a direction of the width. In particular, the width curve can be formed so as to be symmetrical in the other direction of the width in terms of the center of the tooth flank or of the tooth head. In formula (1), $b_{profil}$ describes a correction factor, in particular a constant. Furthermore, x describes the x-position along the width of the tooth flank or of the tooth head, in particular in terms of the center of the tooth flank or of the tooth head as zero point, where x is less than $x_{ende}$.

$x_{start}$ describes the starting point of the correction in the x-direction, in particular the starting point of the logarithmic curved portion of the width curve. Typically, $x_{start}$ corresponds to the beginning of a peripheral region in which the width curve is designed to be curved. As has been described herein with reference to additional embodiments, $x_{start}$ in typical embodiments may also be zero, so that the width curve is designed to be curved proceeding from the center, in particular designed to be curved over the entire width of the tooth flank or of the tooth head.

$x_{ende}$ describes the end point of the correction in the x-direction, in particular an x-position outside the periphery of the tooth flank or of the tooth head, for example slightly outside the periphery of the tooth flank or of the tooth head. In particular, $x_{ende}$ is typically to be chosen in such a way that x-positions on the tooth flank are not equal to $x_{ende}$. Typically, $x_{ende}$ is more than x for all x-positions on the tooth flank, so that in particular the end of the correction curve lies outside the tooth flank.

In typical embodiments, a longitudinal curve extending on the tooth flank and perpendicularly to the width of the tooth flank is at least partially curved. For example, the longitudinal curve can be embodied in the form of a logarithmic spiral, or with a radius. A design embodiment of a tooth comprising a tooth flank having a longitudinal curve in the form of a logarithmic spiral is described in EP 2 129 935 A2, for example. The obliqueness of the tooth flank in relation to the longitudinal axis of the tooth can vary along the longitudinal curve extending so as to be at least partially curved. In typical embodiments, a function describing the width curve is dependent on a position along the longitudinal axis (y-axis) of the tooth. In particular, a function which describes the profile of the width curve on the tooth flank, and in a section plane perpendicular to the tooth flank, can be dependent on a local obliqueness of the tooth flank in relation to the longitudinal axis of the tooth.

According to typical embodiments, a method for producing a tooth for a gearbox described herein is specified. The method comprises providing a tooth blank of the tooth. The tooth blank can be a round tooth flank, for example. In particular, the tooth blank can be designed to be cylindrical.

Typical methods comprise producing a tooth flank of the tooth, wherein the tooth flank is produced so as to be at least partially curved along a width curve extending over a width of the tooth flank. The tooth flank can be formed having a width curve according to embodiments described herein. Additionally or alternatively, typical methods comprise producing a tooth head having a tooth head width curve according to embodiments described herein. In embodiments, the tooth head is also produced conjointly with the tooth flank.

According to typical embodiments, producing the tooth flank or the tooth head comprises grinding of the tooth blank. In particular, the tooth flank or the tooth head can be ground by means of a grinding disk. Typically, the grinding of the tooth blank comprises actuating the grinding disk in the direction of a longitudinal axis of the tooth blank. In particular, the actuation can take place in the y-direction according to an x, y, z-coordinate system described herein. The grinding disk typically rotates about an axis parallel to the z-axis. Typically, grinding the tooth blank comprises varying the actuation of the grinding disk in the direction of the longitudinal axis of the tooth blank (y-direction) as a function of the position of the grinding disk along the tooth width or the width of the tooth flank (x-direction). For example, the variation of the actuation can take place by a correction value dy(x) according to formula (1). In embodiments, the actuation in the y-direction, which is carried out by a grinding machine, can be a function of a diameter D of a grinding disk of the grinding machine, wherein the grinding disk is specified to grind the tooth flank or the tooth head. In particular, the actuation carried out by the grinding machine can be a function f of the position of the grinding disk in the x-direction and of the diameter D: y=f(x,D). For example, the function f can include the correction value dy(x). The highest accuracies, for instance correction values in the low μm range, are typically achieved in the case of an actuation in the y-direction. In additional typical embodiments, an actuation can take place in the z-direction, in particular in the direction of the rotation axis of the grinding disk, or a rotation of the tooth, in particular of a round tooth, about its longitudinal axis (about the y-axis) can take place during grinding.

According to typical embodiments, the tooth flank, and in particular the tooth head, are produced by profile grinding. The grinding disk for grinding the tooth flank, and in particular the tooth head, is typically designed as a profiled grinding disk. The negative of the tooth profile is in particular represented in a profiled grinding disk. In embodiments, the method comprises grinding an tooth flank, in particular by discontinuous profile grinding. In particular, the tooth flank, in particular the tooth flank and the tooth head, can be produced by means of the profiled grinding disk in a first grinding procedure. In a second grinding procedure, the additional tooth flank can be produced by means of the profiled grinding disk, for example after rotating the tooth by 180° relative to the grinding disk.

The method for producing a tooth typically comprises additional method steps for producing further features of a tooth. For example, a tooth base on the radially inner end of the tooth can be machined. The additional method steps can take place before or after producing the tooth flank or the tooth head.

According to a further aspect, a method for producing a gearbox according to embodiments described herein is specified, comprising producing a plurality of teeth according to typical methods described herein. Furthermore, the method comprises providing additional components of a gearbox described herein, for instance a cam disk, a tooth carrier or a ring gear. The method comprises assembling the teeth and the further components so as to form a gearbox according to embodiments described herein.

In comparison to the prior art, typical embodiments of the gearbox can offer the advantage that edge stress on the tooth flanks can be reduced or avoided. Typical gearboxes can display a reduced running-in behavior. Teeth having an at least partially curved width curve can in particular display less running-in wear during operation. In particular, a tooth flank produced according to embodiments described herein can preclude any wear during operation. Furthermore, embodiments can have a higher load bearing capability, in particular a high hydrodynamic load bearing capability in terms of the contact between teeth and the internal toothing of the ring gear with minor solids contact area percentages. Typical methods can in particular provide an advantageous production of teeth having tooth flanks described herein.

BRIEF DESCRIPTION OF THE DRAWINGS

The invention will be explained in more detail hereunder by means of the appended drawings. In the figures.

DETAILED DESCRIPTION

In the following text, typical embodiments of the invention will be described on the basis of the figures, the invention not being restricted to the exemplary embodiments, but rather the scope of the invention being defined by way of the claims. In the description of the embodiments, the same reference signs are used in some circumstances for identical or similar parts in different figures and for different embodiments. Features which have already been described in conjunction with other figures are in part not described again for the sake of clarity. For the sake of clarity, in some cases not all the respective features are provided with a reference sign, for example the teeth (reference sign 9 in FIG. 1).

Figure 1:
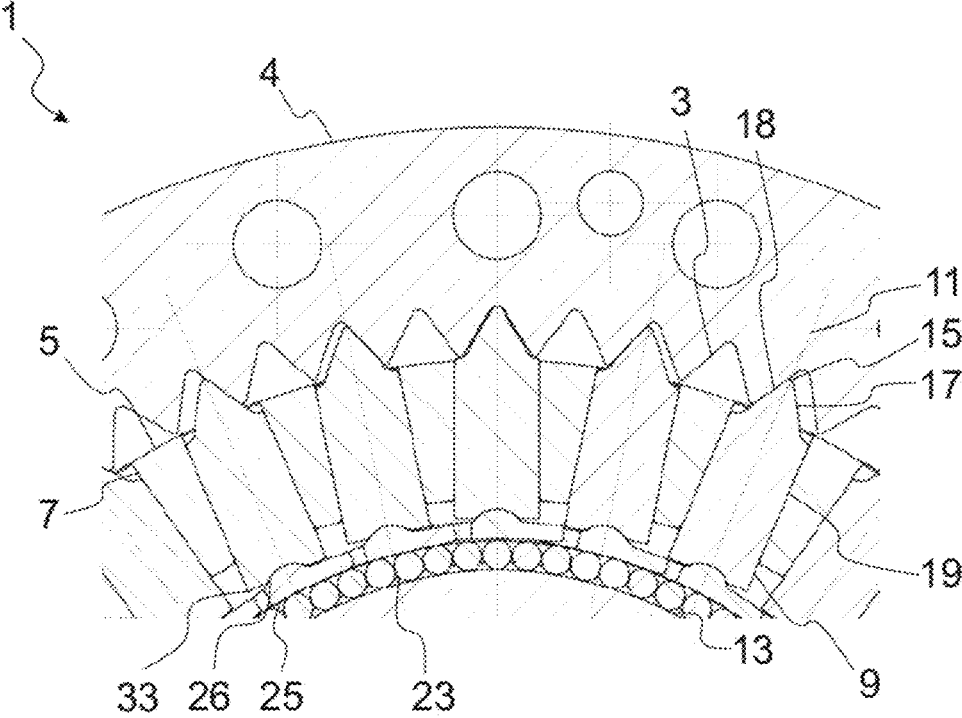
FIG. 1 shows a fragment of an embodiment of a typical gearbox in a schematic sectional view.

A fragment of a typical embodiment of a gearbox 1 is illustrated in a schematic sectional view (radial section) in FIG. 1. FIG. 1 shows the gearbox 1 having teeth 9 which are received so as to be displaceable in guides 7 of a tooth carrier 5. The teeth 9 are typically designed according to embodiments described herein. The tooth carrier 5 is disposed between an internal toothing 3 of a ring gear 4 and a cam disk 13. In FIG. 1, the guides 7 are radially aligned, and the teeth 9 are mounted so as to be radially displaceable in the guides 7. In particular, the teeth 9 are displaceable along their respective longitudinal axis 11. The teeth 9 can be radially displaced for engagement with an internal toothing 3 of the ring gear 4.

The cam disk 13 in the gearbox 1 of FIG. 1 serves as a drive element of the gearbox 1. The cam disk 13 has a profiling in the circumferential direction of the cam disk 13. In FIG. 1, the profiling has a profile with two elevations over the circumference so that respectively opposite teeth 9 engage to the greatest extent and to equal depths in the internal toothing 3. In additional embodiments, the cam disk can have only one elevation or more than two elevations.

In the exemplary embodiment of FIG. 1, the rotation axis (not shown) of the cam disk 13 extends perpendicularly to the image plane of FIG. 1. In terms of the rotation axis of the cam disk 13, the cam disk 13 is disposed radially within the teeth 9, and the internal toothing 3 of the ring gear 4 is disposed radially outside the teeth 9 in terms of the rotation axis of the cam disk 13. In such a configuration, the drive output is acquired on the ring gear 4 or on the tooth carrier 5, wherein the respective other element is fixedly established. In additional embodiments, the drive of the gearbox can take place by way of the ring gear, or by way of the tooth carrier, and the drive output can take place by way of the cam disk.

The gearbox 1 comprises a segmented mounting for the teeth 9. The segmented mounting comprises pivoting segments 25 which have in each case a round tooth bearing face 26 on the side that faces the tooth 9. The tooth bearing face 26 forms a bead on which a tooth base 33 of a tooth 9 is disposed, said tooth base 33 being provided on a radially inner end of the tooth 9. Conjointly with a corresponding clearance in the tooth base 33 of the respective tooth 9, the bead prevents the tooth 9 from sliding out of position relative to the pivoting segment 25. The pivoting segments 25 are mounted on the cam disk 13 by way of rolling members 23, these being needle rollers in FIG. 1.

In FIG. 1, a tooth 9 comprises in each case two tooth flanks, in particular a tooth flank 17 and an additional tooth flank 18, which converge in the longitudinal direction of the tooth 9 toward a tooth head 15 of the tooth 9. The tooth flanks and the tooth head 15, on a radially outer end of the tooth 9, are provided to engage with the internal toothing 3. Between the tooth flanks and the tooth base 33 of the tooth 9, the tooth 9 has a tooth body 19 which is displaceably mounted in a guide 7 of the tooth carrier 4.

Figure 2:
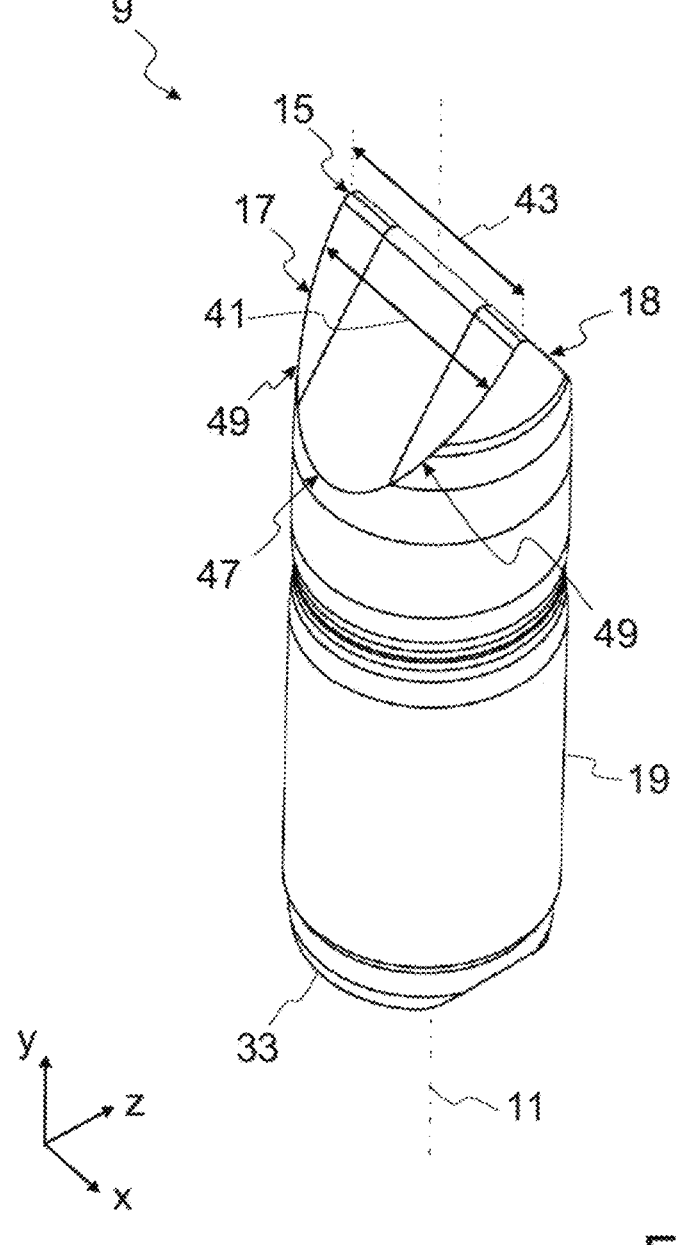
FIG. 2 a tooth of a typical embodiment in a schematic view.

FIG. 2 shows a schematic view of a tooth 9 according to a typical embodiment. The tooth 9 is embodied as a single tooth, in particular as a round tooth. The tooth 9 comprises in particular a tooth flank 17, an additional tooth flank 18 and a tooth head 15 which is provided between the tooth flanks. The tooth head 15 is designed with a head radius between the tooth flanks. The tooth flank 17 and the additional tooth flank 18 are formed symmetrical in terms of a plane that comprises the longitudinal axis 11 (y-direction) of the tooth 9 and extends parallel to a tooth width 43 (x-direction) of the tooth 9. In a typical gearbox 1, the tooth width 43 of the tooth 9 is aligned parallel to the rotation axis of the gearbox 1, and the longitudinal axis 11 is aligned radially in terms of the rotation axis.

Figure 3:
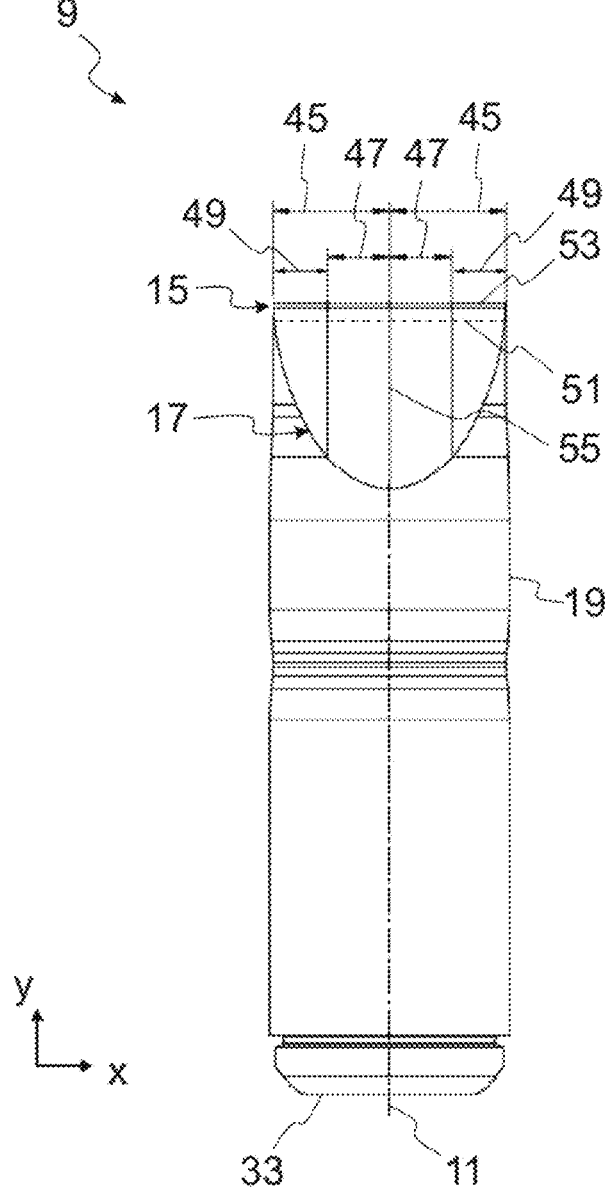
FIG. 3 shows the tooth of FIG. 2 in a lateral view.

The tooth flank 17 has two peripheral regions 49 in the direction of the width 41 of the tooth flank 17, and a central region 47 between the two peripheral regions 49. FIG. 3 shows the tooth 9 in a lateral view. The tooth flank 17 is in particular designed so as to be symmetrical in terms of a centric longitudinal curve 55 of the tooth flank 17. The tooth flank 17 extends so as to be at least partially curved along a width curve 51 over the width 41 of the tooth flank 17. In FIGS. 2 and 3, the tooth flank 17 in the peripheral regions 49 extends so as to be curved in the direction of the width 41 of the tooth flank 17, as is explained hereunder in the context of FIG. 4, for example. In particular, the tooth flank 17 has in the peripheral regions 49 a correction in the form of a recess of the tooth flank 17 toward the inside in relation to the central region 47 of the tooth flank 17. The width curve 51 extends so as to be straight in the central region 47. In additional typical embodiments, the width curve can be embodied so as to be curved over the entire width of the tooth flank. The tooth flank in FIGS. 2 and 3 is designed so as to be curved, in particular in the form of a logarithmic spiral, along the longitudinal curve 55.

The tooth head 15 likewise has a recess in relation to the central region 47 in the peripheral regions 49. The recess in the peripheral regions 49 here is formed in the direction of the longitudinal axis 11 of the tooth 9, so that the profile of the tooth head 15, in particular the height of the tooth head 15 in the direction of the longitudinal axis 11, descends proceeding from the center of the tooth 9 toward the periphery of the tooth head 15. The recess on the tooth head 15 corresponds in terms of its shape to the correction of the tooth flank 17. In particular, a tooth head width curve 53 extending in the direction of the tooth width 43 extends so as to be curved in the peripheral regions 49, in particular in the form of a logarithmic function. In additional typical embodiments, the tooth head width curve can be embodied so as to be curved over the entire width of the tooth flank.

Figure 4:
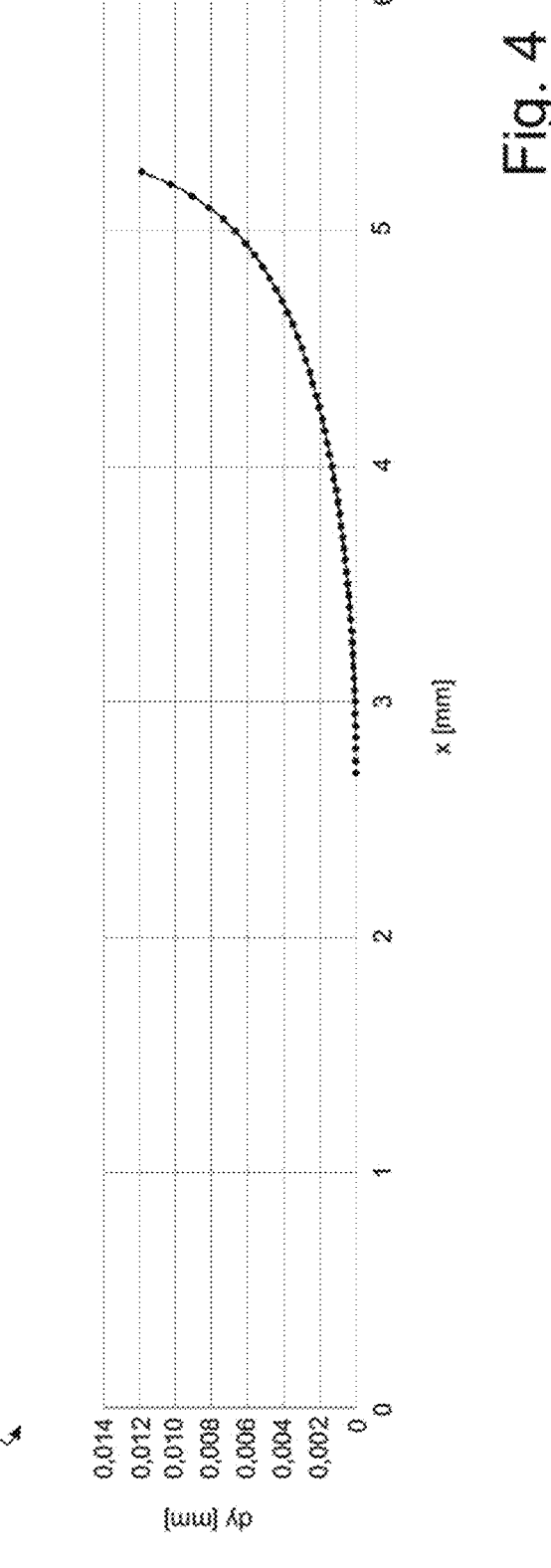
FIG. 4 shows a graph which illustrates the profile of a correction value dy(x) for a tooth flank in a peripheral region of the tooth flank, wherein the zero point of the graphs is in the center of the width of the tooth flank.

FIG. 4 shows a graph 400 which describes a logarithmic function according to the formula (1) described herein. The logarithmic function describes in particular correction values dy(x) for the actuation of a grinding disk in the y-direction for producing the tooth flank 17 of the tooth 9 illustrated in FIGS. 2 and 3. In particular, the x-direction and y-direction of the graph 400 correspond to the orthogonal x, y, z-coordinate system illustrated in FIGS. 2 and 3. The graph 400 here shows the correction values for x-positions only for half a tooth width 45 (cf. FIG. 3). The zero point of the graph 400 is in the center of the tooth width 43. The tooth 9 has a tooth width 43 of 10.5 mm, for example. As is illustrated in FIG. 4, the tooth flank 17 has the correction in a peripheral region from $x_{start}$=2.7 mm to the periphery of the tooth flank at $x_{ende}$=5.25 mm. The peripheral region comprises approximately 25% of the tooth width 43 of the tooth 9. In the production of the tooth flank 17, a grinding disk is actuated closer to the tooth blank as a function of the x-position by the correction value dy(x), so as to produce a recess of the tooth flank 17 and of the tooth head 15 in the form of a logarithmic function along the width 41 of the tooth flank 17. The tooth head width curve 53 produced as a result likewise corresponds to the logarithmic function illustrated.

Figure 5:
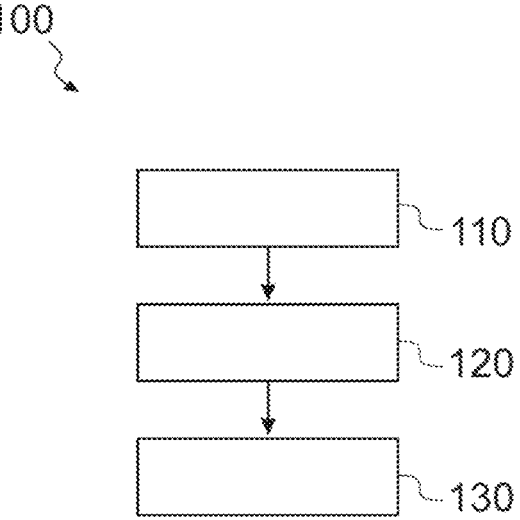
FIG. 5 shows a flow chart of a method for producing a tooth according to a typical embodiment.

FIG. 5 shows a flow chart of a typical method 100 for producing a tooth 9 for a gearbox 1. At block 110, the method 100 comprises providing a tooth blank, in particular a cylindrical tooth blank, for producing a round tooth with two tooth flanks by discontinuous profile grinding.

At block 120, the method 100 comprises producing a tooth flank 17 of the tooth 9, wherein the tooth flank 17 is produced so as to be at least partially curved along a width curve 51 extending over a width 41 of the tooth flank 17. A profiled grinding disk which represents the profile of the tooth flank 17 and of the tooth head 15 is used for producing the tooth flank 17. At block 120, the profiled grinding disk is actuated in the y-direction, whereby the actuation is varied by a correction value as a function of the position of the grinding disk along the tooth width 43 (x-direction), for example by a correction value dy(x) according to formula (1), or as is illustrated in FIG. 4. Conjointly with the correction of the tooth flank 17, the tooth head 15 is also produced with a corresponding recess along a tooth head width curve 53 of the tooth head 15.

At block 130, the method 100 comprises producing an additional tooth flank 18 of the tooth 9. In particular, the tooth blank and the grinding disk are rotated by 180° relative to one another about the longitudinal axis 11 (y-direction) of the tooth 9. The additional tooth flank 18 is produced by means of profile grinding, using the grinding disk in a manner analogous to the tooth flank 17. When used in a gearbox 1, a tooth 9 produced in such a manner can in particular display less wear during the running-in phase of the gearbox.

The invention claimed is:

1. A gearbox (1), comprising
a ring gear having an internal toothing (3);
a tooth carrier (5) having guides (7) which are aligned radially in terms of a rotation axis of the gearbox;
teeth (9) which, for engaging with the internal toothing (3), are received in the guides (7), wherein the teeth (9) are mounted in the guides (7) displaceable in the direction of their longitudinal axis (11) relative to the tooth carrier (5); and a cam disk (13) which is rotatable about the rotation axis and is operatively connected to the teeth (9);

wherein the teeth (9) have in each case a tooth flank (17) which is at least partially curved along a width curve (51) extending over a width (41) of the tooth flank (17), and wherein the tooth flank (17) has two peripheral regions (49) along the width curve (51) over the width (41) of the tooth flank (17), and a central region (47) between the two peripheral regions (49), wherein the tooth flank (17) in at least one peripheral region of the two peripheral regions (49) is recessed inward in relation to the central region (47).

2. The gearbox (1) according to claim 1, wherein the at least one peripheral region is recessed in a direction perpendicular to the tooth flank by at most 1% of a maximum width of the tooth flank (17) in relation to the central region (47).

3. The gearbox (1) according to claim 1, wherein the width curve (51) is curved in at least one peripheral region of the two peripheral regions (49), and is straight in the central region (47) of the tooth flank (17).

4. The gearbox (1) according to claim 1, wherein the two peripheral regions (49) comprise in each case at least 10% and at most 40% of the width (41) of the tooth flank (17).

5. The gearbox (1) according to claim 1, wherein the teeth (9) comprise in each case one additional tooth flank, wherein the additional tooth flank is mirror-symmetrical to the tooth flank (17).

6. The gearbox (1) according to claim 1, wherein a curved part of the width curve (51) corresponds to a logarithmic function or to a radius correction.

7. The gearbox (1) according to claim 1, wherein the width curve (51) extends on the tooth flank (17) and in a section plane perpendicular to the tooth flank.

8. The gearbox (1) according to claim 1, wherein the tooth flanks of the teeth (9) are formed by grinding.

9. The gearbox (1) according to claim 1, wherein a longitudinal curve (55) extending on the tooth flank (17) and perpendicularly to the width (41) of the tooth flank (17) is at least partially curved.

10. A gearbox (1), comprising a ring gear having an internal toothing (3);

a tooth carrier (5) having guides (7) which are aligned radially in terms of a rotation axis of the gearbox;

teeth (9) which, for engaging with the internal toothing (3), are received in the guides (7), wherein the teeth (9) are mounted in the guides (7) displaceable in the direction of their longitudinal axis (11) relative to the tooth carrier (5); and a cam disk (13) which is rotatable about the rotation axis and is operatively connected to the teeth (9);

wherein the teeth (9) have in each case a tooth flank (17) which is at least partially curved along a width curve (51) extending over a width (41) of the tooth flank (17), and wherein the width curve (51) extends symmetrically in terms of a center of the width (41) of the tooth flank (17).

11. The gearbox (1) according to claim 10, wherein the tooth flank (17) has two peripheral regions (49) along the width curve (51) over the width (41) of the tooth flank (17), and a central region (47) between the two peripheral regions (49), wherein the tooth flank (17) in at least one peripheral region of the two peripheral regions (49) is recessed inward in relation to the central region (47).

12. A gearbox (1), comprising a ring gear having an internal toothing (3);

a tooth carrier (5) having guides (7) which are aligned radially in terms of a rotation axis of the gearbox;

teeth (9) which, for engaging with the internal toothing (3), are received in the guides (7), wherein the teeth (9) are mounted in the guides (7) displaceable in the direction of their longitudinal axis (11) relative to the tooth carrier (5); and a cam disk (13) which is rotatable about the rotation axis and is operatively connected to the teeth (9);

wherein the teeth (9) have in each case a tooth head (15), wherein a tooth head width curve (53) extending along the tooth head (15) and over a tooth width (43) of the tooth (9) is at least partially curved in the direction of the longitudinal axis of the tooth.

13. The gearbox (1) according to claim 12, wherein a curved part of the tooth head width curve (51) extends in the form of a logarithmic function or of a radius.

14. The gearbox (1) according to claim 12, wherein the tooth head (15) in a peripheral region of the tooth (9) is recessed by at least 0.02% and at most 2% of the tooth width in relation to a maximum height of the tooth head (15) in the direction of the longitudinal axis (11) of the tooth (9), wherein the tooth head (15) has the maximum height in a central region (47) of the tooth head (15) in terms of the tooth width (43).

15. The gearbox (1) according to claim 12, wherein the tooth head has two peripheral regions along the tooth head width curve over the tooth width of the tooth, and a central region between the two peripheral regions, wherein the tooth head in at least one peripheral region of the two peripheral regions is recessed inward in relation to the central region.

16. The gearbox (1) according to claim 15, wherein the tooth head width curve is curved in at least one peripheral region of the two peripheral regions, and is straight in the central region.

17. The gearbox (1) according to claim 15, wherein the two peripheral regions of the tooth head comprise in each case at least 10% and at most 40% of the tooth width.

18. A tooth (9) for a gearbox (1) according to claim 12, wherein the tooth (9) has a tooth flank (17) which is at least partially curved along a width curve (51) extending over a width (41) of the tooth flank (17).

19. A method (100) for producing a tooth (9) for a gearbox (1) according to claim 12, comprising the following steps:

providing a tooth blank of the tooth (9); and producing a tooth flank (17) of the tooth (9), wherein the tooth flank (17) is produced so as to be at least partially curved along a width curve (51) extending over a width (41) of the tooth flank (17), and/or producing a tooth head (15) of the tooth (9), wherein a tooth head width curve (53) extending along the tooth head (15) and over a tooth width (43) of the tooth (9) is produced so as to be at least partially curved, in the direction of the longitudinal axis of the tooth (9).

20. The method (100) according to claim 19, wherein producing the tooth flank (17) comprises grinding of the tooth blank, comprising the following steps:

actuating a grinding disk in the direction of a longitudinal axis of the tooth blank; and varying the actuation of the grinding disk in the direction of the longitudinal axis of the tooth blank as a function of the position of the grinding disk along the width of the tooth flank (17).

* * * * *